Feb. 1, 1938.         C. J. SCHENK         2,107,219
WINDMILL
Filed Dec. 1, 1936         2 Sheets-Sheet 1

Charles J. Schenk
INVENTOR

BY Victor J. Evans & Co.
ATTORNEYS

Feb. 1, 1938.   C. J. SCHENK   2,107,219
WINDMILL
Filed Dec. 1, 1936   2 Sheets-Sheet 2
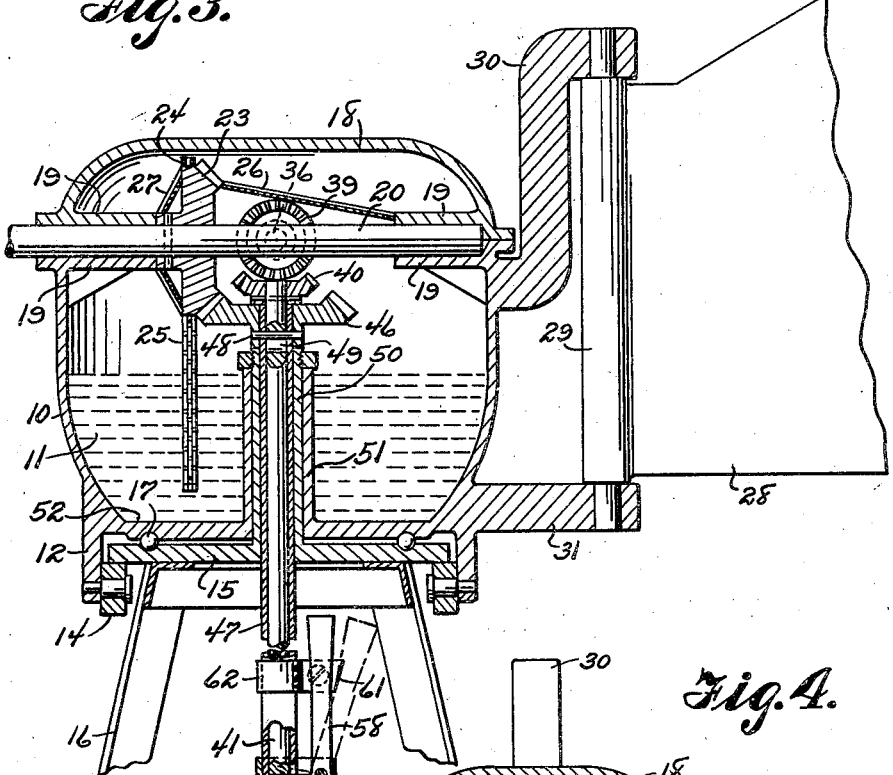

Patented Feb. 1, 1938

2,107,219

UNITED STATES PATENT OFFICE 2,107,219

WINDMILL

Charles J. Schenk, Buckeye, Ariz.

Application December 1, 1936, Serial No. 113,689

3 Claims. (Cl. 170—47)

This invention relates to windmills and has for an object to provide a windmill having novel means for closing the pivoted vane to move the windwheel off the wind when it is desired to stop operation of the windmill.

A further object is to provide a novel brake mechanism for stopping rotation of the windwheel as the pivoted vane is being closed.

A further object is to provide a windmill having novel means for opening the vane to position the windwheel in the wind when it is desired to start the operation of the windmill.

A further object is to provide a windmill having novel means for oiling the bearings so that the windmill will not squeak.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 3 is an enlarged longitudinal sectional view taken on the line 3—3 of Figure 2; and Figure 4 is an enlarged cross sectional view taken on the line 4—4 of Figure 2.

Figure 2:
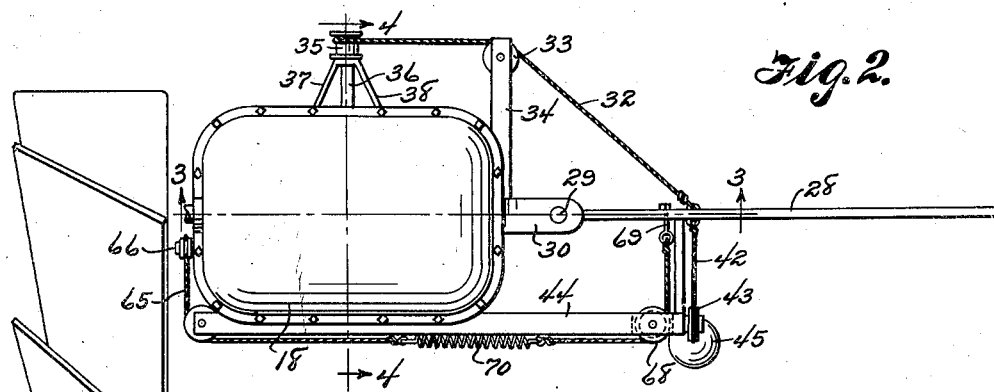
Figure 2 is a plan view of the windmill.
Figure 1:
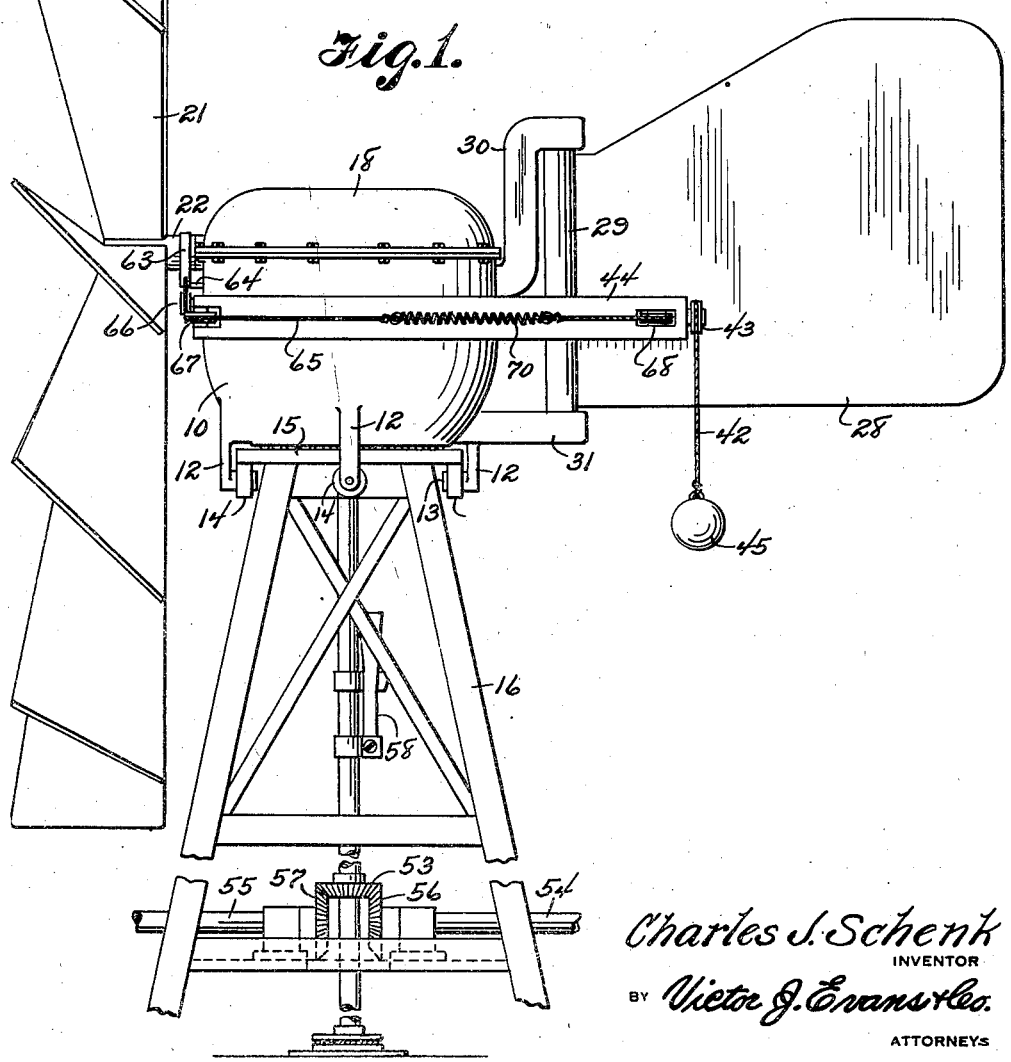
Figure 1 is a side elevation of a windmill constructed in accordance with the invention.

Referring now to the drawings in which like characters of reference designate similar parts in the various views, 10 designates a bowl adapted to form a reservoir for a supply of lubricating oil 11, the bowl having depending bracket arms 12 provided with angularly disposed shafts 13 which are equipped with rollers 14 that engage underneath the table 15 at the top of the supporting frame 16 of the windmill and rotatably secure the bowl on the table. Ball bearings 17 are disposed in a suitable ball race the coacting grooves of which are formed in the table and in the bottom of the bowl to reduce friction.

A cover 18 closes the top of the bowl and in the cover and in the walls of the bowl are coacting halves 19 of horizontal bearings which rotatably receive a shaft 20. One end of the shaft extends outwardly from the bowl and is equipped with a windwheel 21. The hub 22 of the windwheel forms a brake drum the purpose of which will presently be described in detail. A bevel gear 23 is fixed to the shaft within the bowl and the bevel gear is provided with sprocket teeth 24 over which an endless chain 25 is trained. The bottom of the chain is submerged in the oil supply 11 so that when the windmill is running the chain will carry the oil upwardly over the gear 23. A corrugated plate 26 is arranged in the bowl to slope downwardly from the gear 23 toward one of the bearings 19 and a conical plate 27 is disposed on the other bearing 19, as best shown in Figure 3, and these plates distribute the oil from the chain to the shaft bearings so that the windmill is thoroughly lubricated at all times and consequently cannot squeak.

A vane 28 is provided with a shaft 29 the ends of which are journaled in upper and lower bracket arms 30 and 31 formed integral with the bowl 10. The vane is thus pivoted to the bracket arms and may swing through an arc of about 90 degrees from open position to closed position to move the windwheel off the wind and stop operation of the windmill.

For moving the vane to closed position a cable 32 is connected at one end to the vane 28 and is trained over a guide roller 33 carried by an arm 34 that extends laterally from the bowl 10. The other end of the cable is secured to a drum 35 which is mounted on a countershaft 36 that enters the bowl. The shaft is supported at the exposed outer end by a bearing 37 that is mounted laterally of the bowl by bracket arms 38, as best shown in Figure 2.

A bevel gear 39 is fixed to the inner end of the countershaft, as best shown in Figure 4, and when this gear is rotated as will be presently described the cable 32 is wound upon the drum 35 and moves the vane to closed position.

For actuating the winding drum a bevel gear 40 is fixed to a stub shaft 41 and meshes with the gear 39 to drive the gear when the stub shaft is moved upwardly. When the stub shaft is moved downwardly the gear 40 is de-meshed from the gear 39 to permit the vane to be moved to open position. For moving the vane to open position when the gears 40 and 39 are de-meshed, a cable 42 is attached at one end to the vane on the opposite side thereof from the cable 32 and is trained over a guide roller 43 carried by a bracket arm 44 that projects from the bowl. The cable is equipped at the lower end with a weight 45. When the gears are de-meshed the weight, which has been previously elevated by movement of the vane to closed position, immediately gravitates and swings the vane to open position to turn the windwheel into the wind.

For driving the stub shaft 41 a bevel gear 46 is fixed to a sleeve 47 which surrounds the stub shaft and is connected to the latter by means of a pin 48 which passes through a vertical slot 49 on the stub shaft. The sleeve 47 is mounted to turn in a bearing 50 that rises from the table 15. A sleeve 51 on the bottom 52 of the bowl houses the sleeve 50 and forms a bearing for the bowl. The gear 46 meshes with the gear 23 on the windwheel shaft 20 and turns both the sleeve 47 and the shaft 41 as a unit when the windwheel rotates. The sleeve is equipped at the bottom with a bevel gear 53 which is geared to driven shafts 54 and 55 by bevel gears 56 and 57.

The stub shaft 41 may, however, be moved upwardly or downwardly while being rotated, to mesh the gear 40 with the gear 39 of the countershaft, or to de-mesh these gears and for this purpose a lever 58 is pivoted on a bracket arm 59 that is carried by the sleeve 47, as best shown in Figure 3, and is equipped with a finger 60 that enters the sleeve below the stub shaft 41. The lever is normally held raised and frictionally engaged between the ears 61 on a ring 62 that is fixed to the sleeve so that the stub shaft is normally held at its lowest limit of movement. When it is desired to stop operation of the windmill the lever 58 is swung to the dotted line position shown and the finger 60 raises the stub shaft 41 to mesh the gears 40 and 39 and wind up the cable on the drum 35. The vane 28 is immediately closed and swings the windwheel 21 out of the wind.

When the stub shaft is raised, as just described, it is desirable that rotation of the windwheel be immediately stopped and for this purpose a brake band 63 is mounted on the brake drum 22 of the windwheel and this brake band is secured at one end to the bowl 18 by a bracket 64. The other end of the brake band is connected to a cable 65 which is trained downwardly over a guide roller 66 on the bowl and then laterally over a guide roller 67 on the bracket arm 54. The cable extends along the bracket arm 44 and is trained over a guide roller 68 at the free end of the guide arm and from this guide roller is directed to the vane 28 and connected to the vane by an eye bolt 69. A helical spring 70 forms a continuation of the intermediate portion of the cable. Closing movement of the vane 28 pulls the cable 65 and tightens the brake band 63 on the brake drum to stop rotation of the windwheel.

To start rotation of the windwheel it is simply necessary to raise the lever 58 to the full line position shown in Figure 3 and permit the stub shaft 41 to drop and de-mesh the gear 40 from the gear 39. Thereupon the weight 45 gravitates and swings the vane 28 to open position. During movement of the vane to open position the cable 65 is immediately slackened to release the brake band 63 and permit the windwheel 21 to rotate.

From the above description it is thought that the construction and operation of the invention will be fully understood without further explanation.

What is claimed is:

1. In a windmill, a bowl rotatable upon a vertical axis, a windwheel shaft in the bowl, a windwheel on the shaft, a vane on the bowl rotatable about a vertical axis, bearings for the vane on the bowl, a countershaft in the bowl, a drum on the shaft outside of the bowl, a cable connected to the vane and windable upon the drum to close the vane, manually controllable means for connecting the countershaft to the windwheel shaft for winding the cable upon the drum, and means for moving the vane to open position after each actuation of the first named means.

2. In a windmill, a bowl rotatable upon a vertical axis, a vane pivoted on the bowl, a windwheel, a shaft for the windwheel journaled in the bowl, a countershaft journaled in the bowl intermediate the ends thereof, a drum on the outer end of the countershaft, a cable connected to the vane and windable upon the drum to swing the vane to closed position, manually operable means for connecting the countershaft to be rotated by the windwheel shaft to wind the cable on the drum, and a weight carried by the bowl and connected to the vane on the opposite side thereof from the first named cable and adapted to gravitate after each actuation of the first named means and move the vane to open position.

3. In a windmill, a rotatable bowl, a vane pivoted on the bowl, a windwheel, a shift for the windwheel journaled in the bowl, a countershaft, a drum on the countershaft, a cable connected to the vane and windable upon the drum to swing the vane to closed position, manually controlled means for connecting the countershaft to be driven by the windwheel shaft for winding the cable upon the drum, a support on the drum, a pulley on said support, a cable connected to the vane on the opposite side thereof from the first named cable and trained over said pulley, a weight on the last named cable adapted to swing the vane to open position after each actuation of said means, a brake drum on the windwheel shaft, a brake band on the brake drum, pulleys on said support, and a cable connected to said brake band and trained over said pulleys, the cable being connected to the vane on the opposite side thereof from the windable cable and so constructed and arranged that when said means is actuated to swing the vane the brake drum will be automatically tightened to stop rotation of the windwheel.

CHARLES J. SCHENK.